March 27, 1951 J. J. VENTERS 2,546,483

TELEPHONE DIAL INDEX ATTACHMENT

Filed April 26, 1948 2 Sheets-Sheet 1

Joseph J. Venters
INVENTOR.

BY Albert H. Kirchner
Attorney

March 27, 1951 J. J. VENTERS 2,546,483

TELEPHONE DIAL INDEX ATTACHMENT

Filed April 26, 1948 2 Sheets-Sheet 2

Joseph J. Venters
INVENTOR.

BY Albert G. Kirchner
Attorney

Patented Mar. 27, 1951 2,546,483

UNITED STATES PATENT OFFICE 2,546,483

TELEPHONE DIAL INDEX ATTACHMENT

Joseph J. Venters, Oklahoma City, Okla.

Application April 26, 1948, Serial No. 23,150

1 Claim. (Cl. 40—10.5)

The present invention relates to memorandum index devices, of the type adapted to contain and exhibit a list of entries, such as the names and numbers of telephone subscribers, and more particularly to a device of this general type which can be attached to a telephone instrument.

Generally speaking, the device includes a strip or web of paper or its equivalent on which names and numbers can be written and which can be wound from one roller or spool to another so as to exhibit successively the different numbers in the area between the rollers or spools.

Such devices are not broadly new, but the present structure is, so far as I am aware, the first to incorporate a number of useful features, principal among which is the capacity to be mounted centrally on the conventional dial disc of a telephone instrument.

Among the objects of the invention are to provide a device of the character indicated which will be structurally simple, inexpensive to make, compact and neat in appearance, with durable and foolproof mechanism, with ample capacity for all the entries needed by the average telephone user, and most especially with means for mounting the device securely but detachably on a telephone instrument.

Other objects and advantages will be apparent to those skilled in the art from the following description, taken in conjunction with the accompanying drawings, which disclose by way of example and not limitation a preferred embodiment of the invention.

Figure 1:
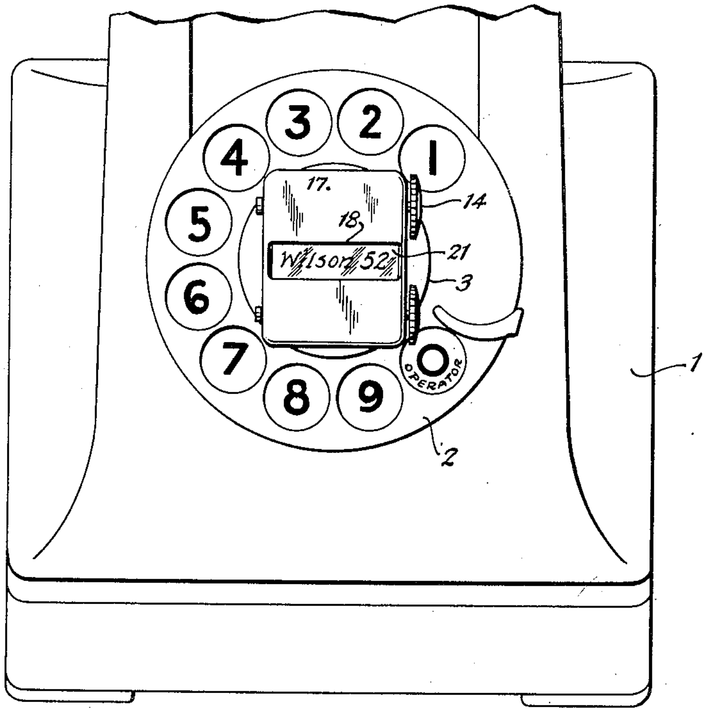
Figure 1 is a top plan view of a telephone instrument base showing the device mounted in operative position.
Figure 2:
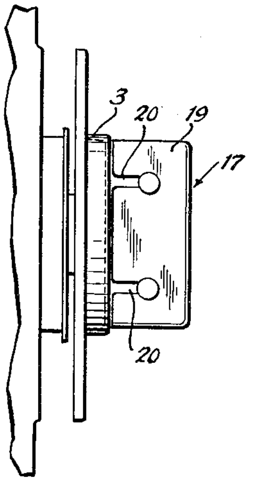
Fig. 2 is a side elevational view of the telephone instrument showing the left hand side of the device of Fig. 1.
Figure 3:
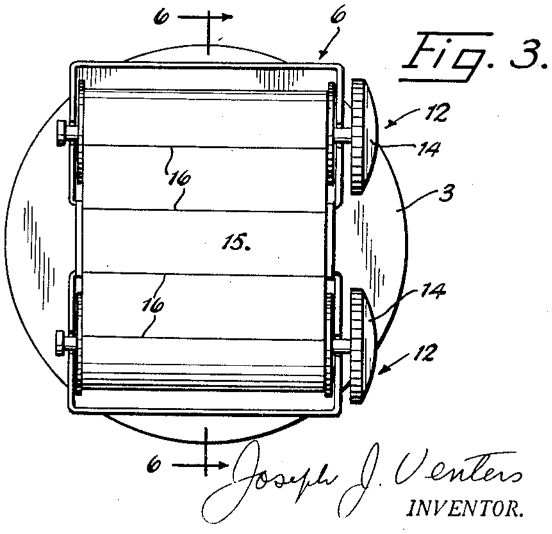
Fig. 3 is a top plan view, on an enlarged scale, of the device with its cover removed.
Figure 4:
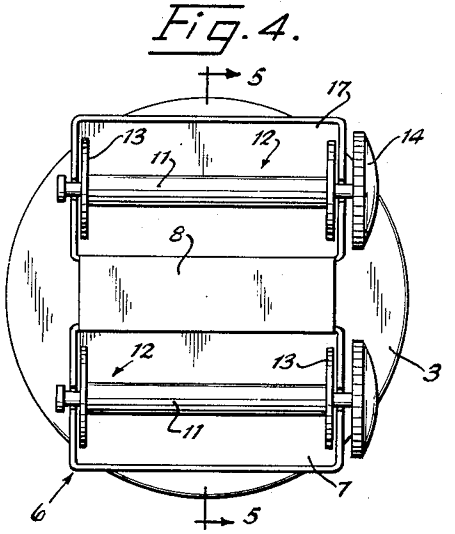
Fig. 4 is a similar view of the device with its cover and web removed.
Figure 5:
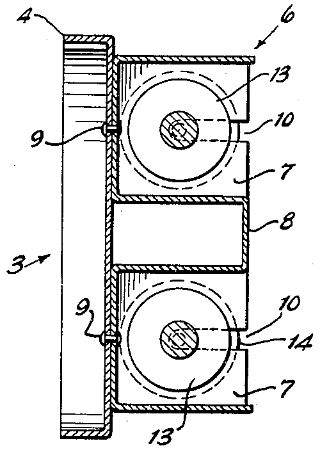
Fig. 5 is a diametrical cross sectional view taken on the line 5—5 of Fig. 4.
Figure 7:
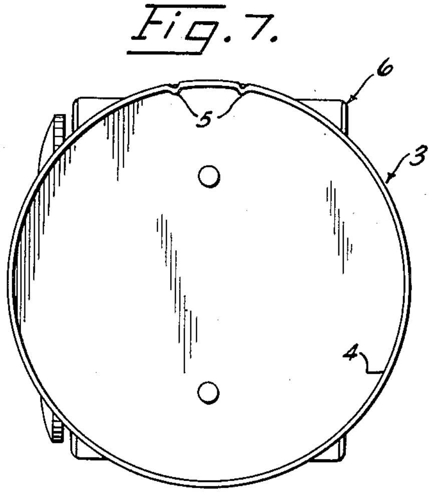
Fig. 7 is a bottom plan view of the device.

In these figures, the reference character 1 designates the base of a conventional telephone instrument of the hand set type on which is mounted the usual rotatable dial disc 2. Such a disc has an elevated central hub of approximately one and one-half inch diameter, and it is this hub to which the device provided by the present invention is removably attached, as shown in Fig. 1, to position the device where it will serve with the utmost convenience a person desirous of quickly ascertaining a telephone number to be called.

To this end the device comprises a base element 3, made in the form of a circular disc having a downturned peripheral flange 4 the inside diameter of which is approximately equal to the outside diameter of the dial disc hub. To frictionally fit the base 3 on the hub, the flange 4 may have one or more small projections 5 struck into it for making a yielding more or less tight frictional fit with the hub, thus enabling the base to be snapped on to and off of the hub.

The base may be made of stamped sheet metal, molded plastic or other suitable material, as may also be the housing and cover elements which will now be described.

The housing 6 is of generally rectangular outline and is formed to provide a pair of rectangular, transversely extending, parallel pockets or chambers 7, each open at its top and spaced apart by a flat area 8, hereinafter called a platen surface, at substantially the elevation of the open tops of the pockets 7. All of this structure may be made of a single piece of stamped sheet metal, molded plastic or the like, and the housing is permanently mounted on the top of the base 3 by any convenient means, such for example as the rivets 9, one at about the center of the bottom of each pocket.

Each pocket contains a spool or roller, which is journalled in the pocket in any convenient manner, as by providing the end walls of the housing 6 with bearing slots 10, each opposite pair of which journal the end portions of the shaft 11 of one of the spools, each of which spools is designated 12 in its entirety. The spools may have end guide flanges 13 near the ends of the shafts within the walls of the housing, and each may have, externally of these walls, a knob 14 by which the spool can be manually rotated.

Figure 6:
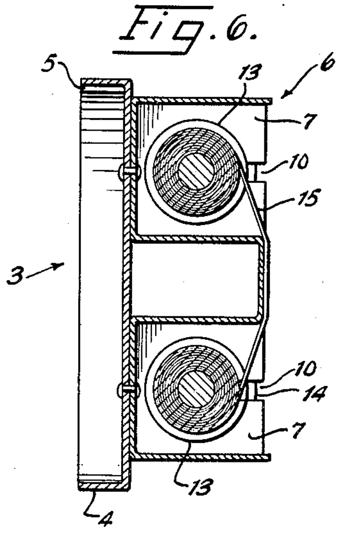
Fig. 6 is a similar view, taken on the line 6—6 of Fig. 3.
Figure 8:
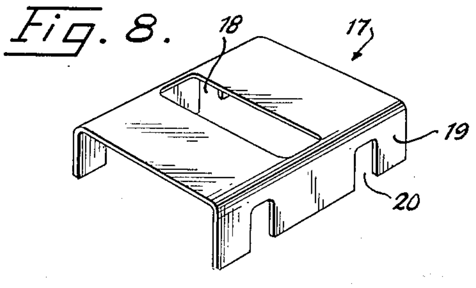
Fig. 8 is a perspective view of the cover.

Permanently affixed to each shaft 11 in any suitable way, as by penetrating a slot in the shaft or by the use of adhesive, is the end portion of a tape or web 15 of paper or other material which can be ruled crosswise by spaced lines 16 and on which names and telephone numbers can be written in the spaces between the lines. The tape is as long as can be wound on one of the spools without exceeding the capacity of the pocket 7 which houses the spool, and it will be obvious that rotation of one or another of the knobs 14 will cause the web to wind onto one of the spools, which may be regarded as a take-up spool, from the other spool, which may be called a supply spool, passing over the platen surface 8, all as best shown in Fig. 6.

The spaces between adjacent lines 16 are of such width (in the direction of the length of the web), as to be accommodated by the corresponding dimension of the platen surface 8. It is thus an easy matter to inscribe with pen or pencil the name and number of a telephone subscriber within each space formed between adjacent lines 16, using the platen surface as a support or backing while writing. It will be obvious also that successive spaces can be exposed from the wound up portions of the web by causing the web to travel over the platen surface 8.

The device is completed by means covering the pockets 7 but leaving the area of the platen surface, or more strictly speaking the portion of the web which at any time overlies the platen surface, exposed for view. Such means comprises a cover 17, having a top area provided with a central opening 18 of somewhat less area than that of the platen surface 8 and having downturned side flanges 19 which are slotted at 20 to base the projecting ends of the spool shafts 11. Like the rest of the sheet metal or plastic elements of the structure, the cover is best made opaque, but a sheet of transparent plastic 21 (Fig. 1) may be laid under its top portion so as to be clamped thereby against the platen surface 8, so as to protect the web while permitting it to be seen through the opening 18. With the cover in place, the web is subjected by the cover to enough gentle pressure to keep the spools 12 from being turned too freely or too fast.

I find it convenient, to prevent excess turning of the spools which might tear the end portions of the web from the spool shafts, to give some distinctive color to the last few inches of each end portion of the web, so that when the colored portion becomes visible through the opening 18, the person using the device will thereby be warned to discontinue rotation of the web on to the spool then acting as a take-up spool.

The web may be printed marginally with the letters of the alphabet, or they may be applied in any manner convenient for properly relating the names to be inscribed on it. In use, one or the other of the two knobs 14 is rotated until the desired entry on the tape appears through the opening 18. The device does not interfere with operation of the dial. It takes up no otherwise useful space, and it is instantly removable for the purpose of viewing the dial hub surface, which generally bears the number of the particular instrument.

The illustrated device is a preferred embodiment of principles which may be varied considerably within the spirit of the invention as pointed out by the appended claim.

I claim:

A telephone dial index attachment comprising a circular disk having a generally closed central area and provided with a downturned peripheral flange for frictionally fitting the hub of a telephone instrument dial, a housing including a pair of spaced chambers each having a bottom wall permanently secured to the central area of the disk and including side and end walls and a platen surface, said platen surface being positioned between the chambers and in substantially the plane of the top edges of the side and end walls, supply and take-up spools journaled in the respective chambers, an index web wound on the spools and movable over the platen surface, a cover having downturned flanges disposed over the walls of the housing and having a central plate overlying the top of the housing and provided with an opening registering with the platen surface, and a sheet of transparent material interposed between said central plate and the portion of the index web which overlies the platen, said cover plate gently pressing on said portion of the index web to yieldably resist turning of the spools.

JOSEPH J. VENTERS.

REFERENCES CITED

The following references are of record in the file of this patent:

UNITED STATES PATENTS

| Number | Name | Date |
|---|---|---|
| 809,445 | Jelliffe | Jan. 9, 1906 |
| 1,491,331 | Baker | Apr. 22, 1924 |
| 1,620,077 | Cooke | Mar. 8, 1927 |
| 1,708,479 | Macdonald | Apr. 9, 1929 |
| 1,765,445 | Porter | June 24, 1930 |
| 2,068,271 | Huott | Jan. 19, 1937 |